United States Patent [19]
Dube et al.

[11] Patent Number: 5,470,376
[45] Date of Patent: Nov. 28, 1995

[54] RECOVERY OF NON-FERROUS METALS FROM DROSS

[75] Inventors: Ghyslain Dube, Chicoutimi; Marko Litalien, Laterriere; Roger Pelletier; Zhou Wang, both of Jonquiere, all of Canada

[73] Assignee: Alcan International Limited, Montreal, Canada

[21] Appl. No.: 275,799

[22] Filed: Jul. 15, 1994

[51] Int. Cl.[6] .................................................. C22B 7/04
[52] U.S. Cl. ............................................................. 75/672
[58] Field of Search ................................................ 75/672

[56] References Cited

U.S. PATENT DOCUMENTS

| | | |
|---|---|---|
| 2,481,591 | 9/1949 | Heilman et al. . |
| 3,043,678 | 7/1962 | Lowry ............................ 75/672 |
| 4,033,760 | 7/1977 | Lance ............................ 75/672 |
| 4,040,820 | 8/1977 | Loach ............................ 75/672 |
| 4,673,591 | 1/1987 | McMahon ...................... 75/672 |

FOREIGN PATENT DOCUMENTS 297635 9/1928 United Kingdom .

*Primary Examiner*—Peter D. Rosenberg
*Attorney, Agent, or Firm*—Cooper & Dunham

[57] ABSTRACT

A process of recovering a non-ferrous metal from a dross containing the same. The process involves introducing into a rotary furnace the dross and a fluoride compound which becomes substantially molten above the melting point of the metal, heating the dross and fluoride compound to a maximum temperature above the melting point of the metal, using a heating device which substantially maintains a non-oxiding atmosphere in the furnace, rotating the furnace until the dross reaches the maximum temperature, removing the molten metal thereby separated from a solid dross residue and removing the solid dross residue from the furnace. The fluoride compound, which may be, for example, cryolite, recovered cryolite, $AlF_3$ or $NaF$, or a mixture thereof, is such that it remains in the dross during the process and does not make the dross become sticky. The use of the fluoride improves the rate of recovery of the metal content of the dross without producing environmental difficulties either during the heating operation or during the disposal or use of the dross residue.

11 Claims, 3 Drawing Sheets

FIG. I

RECOVERY OF NON-FERROUS METALS FROM DROSS

BACKGROUND OF THE INVENTION

1. Field of the Invention

This invention relates to the recovery of non-ferrous metals, particularly aluminum, from dross resulting from secondary melting and remelt operations.

2. Discussion of the Prior Art

Dross is a material which forms on the surface of molten non-ferrous metals during remelting and metal holding and handling operations when the molten metal is in contact with a reactive atmosphere, such as air. Dross normally consists of metal oxides entraining a considerable quantity of molten free (un-reacted) metal, and for economic reasons it is desirable to extract the free metal before discarding the residue.

The traditional processes for recovering the free metal generally involve one or several of the following steps:

1. Cooling of the dross using either a mechanical cooler or a dross room (where the dross is spread out over a floor).
2. Transportation of the cooled dross to a dross treatment plant.
3. Crushing and screening of the cooled dross, followed by elimination (usually by dumping) of the fine fraction which consists mainly of oxides and which may be dangerous and disadvantageous to handle in subsequent steps.
4. Heating of the larger dross fractions in the presence of a molten salt bath in order to remelt the metallic fraction and cause the resulting molten droplets to coalesce.

Step 4 is normally carried out in a rotary furnace. The dross fractions and salt mixture are charged and heated to a temperature above the melting point of the metal using direct flame burners. The furnace is then rotated at a suitable rate of speed to obtain a tumbling or cascading action of the mixture. Examples of such processes are disclosed for example in U.S. Pat. No. 3,676,105 to McLeod et al, U.S. Pat. No. 3,789,024 to Murphy et al, and U.S. Pat. No. 4,030,914 to Papafingos et al, all of which disclose the use of salt mixtures as fluxes.

All salt mixtures normally used in Step 4 are selected to be molten at the operating temperatures in order to protect the molten metal surface, and sufficient quantities must be added to completely cover the molten metal. The salt mixtures most frequently used are chloride-based in order to have a sufficiently low melting point, but frequently have added fluoride salts, such as cryolite. The fluoride salts are added for various reasons including improving the fluidity and wettability of the molten salt, and improving the solubility of oxides in the molten salt mixture. A typical salt mixture consists of a 50:50 mixture of NaCl and KCl to which a small quantity (for example 5 wt. %) of a fluoride salt, such as cryolite, is added.

Disadvantageously, the molten salts generate salt fumes which are corrosive both within the plant and in the external environment, and the residual salt cake containing dross impurities is very polluting because the salts are water soluble and are readily leached out of dump sites.

Processes have been proposed which use some form of heating by direct plasma means (Dubé et al, U.S. Pat. No. 4,952,237; Lindsay, U.S. Pat. No. 4,997,476; Drouet, U.S. Pat. No. 5,245,627) or by an indirect electrical method (Montanga, U.S. Pat. No. 3,999,980) to permit heating of the dross to temperatures sufficient to melt and release the molten metal without using molten salt fluxes to protect the furnace charge. These methods work by controlling the furnace atmosphere to protect the charge from reaction with excessive amounts of oxidizing gases (oxygen, water, carbon dioxide) during processing, thus making it possible obtain acceptable recoveries. However, these methods do not allow all of the metal trapped in the dross oxide layers to be completely released by heating alone and the recoveries, particularly from drosses generated in secondary melting and remelting processes, are lower than desirable. Recoveries may be as much as 6% less in these processes than processes based on conventional molten salt treatment methods and the resulting economic penalty can be severe.

SUMMARY OF THE INVENTION

It is therefore an object of the present invention to provide an improved process for the recovery of non-ferrous metals, and particularly aluminum, from drosses containing such metals arising from secondary melting and handling operations.

Another object of the invention is to improve the percentage recovery of metal from dross recovery processes that do not rely primarily on the use of molten salt baths.

According to one aspect of the invention, there is provided a process of recovering a non-ferrous metal from a dross containing the metal, comprising: introducing into a rotary furnace the dross and a fluoride compound which becomes substantially molten only above the melting point of the metal; heating the dross and fluoride compound to a maximum temperature above the melting point of the metal using a heating means that substantially maintains a non-oxidizing atmosphere in the furnace; rotating the furnace continuously, intermittently or in a reciprocal fashion until the dross reaches the maximum temperature; removing the molten metal thereby separated from a solid dross residue; and removing the solid dross residue from the furnace. The fluoride compound is such that it remains in the dross during the process and avoids making the dross "sticky" or "mushy" (i.e tending to clump or form a paste rather than a dry solid).

Most preferably, the process involves the use of a fluoride compound having a melting point or melting range high enough that the process may be carried entirely without causing the fluoride compound itself to become substantially molten.

A characteristic of the present invention is the use of a fluoride salt that does not, during the process, generate molten or fluid material that causes the dross to become sticky or to coalesce. Whilst this may be accomplished by using any fluoride salt at a very low concentration, it is a preferred and surprising feature of the present invention that a fluoride salt may be used that alone does not become molten or fluid at the process temperatures required to melt and coalesce the metal. The term "fluoride salt" includes mixtures of different fluoride salts, and it is known that, in the case of salt mixtures, melting can occur over a wide range of temperatures, and such mixtures may include small portions that melt at very low temperatures. Nevertheless, such mixtures of salts are not excluded from the preferred embodiment of this invention unless the compositions are such that the mixtures become fluid or molten at the process temperatures.

The heating of the dross is preferably carried out using a plasma generated by a plasma generating means, although other heating means that prevent the introduction of oxidizing gases into the furnace may be used, e.g. "external" electrical heating devices that introduce heat through the furnace wall. So-called "reduced oxygen" burners may be usable in heating the dross, except where such burners introduce other reactants such as water vapour into the furnace. Burners such as oxy-carbon burners which do not introduce water into the furnace are useable, since residual oxidizing gases can react with the dross without significant loss in recoverable metal. However the preferred heating is carried out by means which do not introduce any oxidizing gas into the furnace and therefore achieve a non-oxidizing atmosphere within the furnace without sacrificing any recoverable metal.

Suitable plasma generating means include, for example, direct current (DC) arcs generated between consumable (usually graphite) or non-consumable (water- or gas-cooled) electrodes, transferred arcs in which the arc is struck between an electrode and the load to be heated or between two electrodes, or contained arcs in which plasma is directed by a flow of gas from a torch containing suitable electrodes. In particular, a contained arc plasma generator has been found especially useful for carrying out this invention as it allows for simple mechanical design of the apparatus. A particular apparatus for carrying out this invention using a contained arc plasma is found in U.S. Pat. No. 4,952,237 to Dubé et al (the disclosure of which is incorporated herein by reference), although any rotary furnace designed for heating dross without using molten fluxes and using a plasma generating means can be used with the present invention. The plasma generating means is often combined with a gas source which delivers gas to the plasma to stabilize it and in some cases to direct it along a desired direction. Gases used for this purpose can include $N_2$, $H_2$, CO, $CO_2$, air, Ar and $CH_4$, as well as mixtures of these gases. In has been found particularly advantageous to use a gas that is non-reactive, and in particular, $N_2$, Ar, or oxygen-depleted air produced when air is subject to a process such as pressure swing absorption (PSA) prior to use to remove most but not all the oxygen from it. However, gases containing free oxygen, or chemically combined but nevertheless reactive oxygen, are preferably not employed in the process. The amount of oxygen introduced by a plasma generator when an oxygen containing gas is used is slight and quickly reacts with a small amount of dross to create a non-oxidizing atmosphere within the furnace. Because there is an inevitable loss of recovery in these cases, a non-reactive gas is generally preferred. Gases or gas mixtures which generate water vapour are to be avoided however, and the presence of water vapour should be prevented for reasons of reactivity and environmental contamination.

The dross treated in the present invention consists essentially of metal and metal oxides, where the oxides are in the form of layers or particles of substantial size. The metal is frequently trapped within oxide layers of substantial thickness. Because dross is formed at metal melting temperatures, it is free of contaminants such as paints, lacquers, etc. normally associated with metal scrap.

While the process of this invention is suitable for all non-ferrous metal drosses conventionally recoverable by the salt bath technique, it is particularly suitable for treating drosses of aluminum or aluminum alloys. The invention is moreover primarily concerned with drosses from mills and extruders that contain little or no metal salt compounds rather than drosses from primary sources.

When treating drosses of aluminum or aluminum alloys, a number of fluoride salts may be used, including NaF, $AlF_3$, $CaF_2$, $K_3AlF_6$, KF, LiF, $MgF_2$, $Na_3AlF_6$ and their mixtures. Cryolite, NaF, $AlF_3$ and mixtures of these salts including mixtures that form specific compounds themselves provide the best combination of features for the present invention. Cryolite is preferred and an inexpensive form of impure cryolite referred to as "recovered cryolite" is particularly preferred because of its relative ease of handling as well as its low cost. Recovered cryolite is a form of cryolite recovered from wastes from the Hall-Heroult process and it generally has a melting point of about 995° C. and contains about 87–90% by weight of $Na_3AlF_6$, about 2% by weight of $Al_2O_3$, about 1–1.5% by weight of $Na_2CO_3$ and about 4% by weight of $Na_2SO_4$.

One of the important features of the process of the invention is that the amount of added fluoride salt may be surprisingly low, generally less than 8% F (i.e. weight of F calculated as a percent of the total load) and frequently much less than this. A preferred feature of the process is that the added salt does not become substantially molten during the process. If cryolite or recovered cryolite is used, generally only 0.4% F to 3.5% F are required (measured by percent by weight F). Larger amounts of cryolite do not bring any advantage and indeed may result in reduced recovery (tests may be carried out to determine an optimum range of addition for each fluoride salt or salt mixture employed). As noted earlier, salts that have a component that may melt are included within the scope of the preferred aspect of the invention if the salts nevertheless remain solid in appearance during the process. Cryolite, at least from some sources, is such a material. Tests have shown that cryolite may contain a small amount of "chiolite" since the material may be non-stoichiometric. This component has a low melting point but the material as a whole remains solid and dry in appearance throughout the process of the invention. While a number of fluoride salts are effective at enhancing the recovery of metal because of their particular interaction with the dross, in practical processes some of these salts are not preferred since they are volatile and either disappear from the furnace charge before they can be effective or being volatile can escape to the environment. Fluoride salts which become molten below the melting point of metal are generally not preferred for these reasons. This includes, for example, $KAlF_4$ which is effective for enhancing metal recovery but is too volatile to be a preferred salt for use in a commercial process.

This invention operates very effectively using fluoride salts only. Small amounts of chloride salt such as the levels that are introduced in dross obtained from secondary melting processes do not however affect the recovery of metal by this process and may be present in the charge. If chloride salts are added in excess of about 25 to 30% by weight of the dross, then the recovery of metal from the dross is actually substantially reduced because the dross becomes agglomerated and the metal cannot be released by the encasing dross. The preferred mode of operation is to avoid the presence of chloride salts altogether except those unavoidably introduced in dross obtained from secondary melting processes.

The enhanced recovery of the present process does not appear to be related to the mechanisms operating in other processes where salts are used. The fluoride salts of the present invention are not substantially molten during the process, and therefore do not provide a protective liquid coating on the metal droplets, nor can they act as solvents for oxide. Furthermore, there are no contaminating materials in the dross which can react with the fluoride salts to produce a protective or metal-releasing effect.

Although not wishing to be bound by a particular theory, it is believed that the present invention operates through the use of reactive fluoride salts which react with the oxide layer and metal to generate an interface that releases the oxide from the metal, and further reacts with the metal to change the surface tension and encourage coalescence. Chloride salts appear to be ineffective as reactive salts, and fluoride salts which react with metals to form Na or K ions are most effective at altering the surface tension and enhancing coalescence. This mechanism is operable at surprisingly low concentrations of fluoride salt, e.g. in amounts insufficient to coat the dross material. It is particularly surprising that a solid fluoride salt at these low concentrations can nevertheless react by solid-solid reactions (with the oxide) or solid-liquid reactions (with the molten metal) sufficient to make the present invention operative. Since cryolite appears to react as a solid to form Na in the metal, it is a particularly preferred salt and is effective at low concentrations. While the mechanism operates for a wide variety of fluoride salts, this surprising capability of operating with a salt that is substantially solid at the melting point of the metal, or more preferably substantially solid during the entire process of metal recovery, overcomes the environmental and operational problems associated with the volatility of salts having lower melting points.

The fluoride salt is generally introduced with the dross into the rotary furnace, which may be preheated. The dross and salt are processed under inert gas until the metal content of the dross is molten and can be removed. For example, in the treatment of drosses from aluminum or aluminum alloys, this requires heating the dross to a temperature of no more than 850° C., and preferably no more than about 750° C., during which time the fluoride salt remains a solid. Once the metal has been removed from the dross, further heating of the remaining solid (the dross residue) can be carried out, including heating to a temperature above the melting point of the fluoride salt, if so desired. Various reactive gases can also be introduced at this stage, if desired, for example to stabilized the residue for subsequent disposal.

The process of the invention has the advantage of improving the yields of recoverable metal from drosses without resorting to the use of molten salt fluxes. The fluoride additions are relatively small and no "salt cake" develops to be disposed of. The fluorides remain in the dross residue after the process is complete but are at low levels and the residue can be used in various secondary processes as a result. The residue can also be reacted with other chemicals (such as CaO) to convert the fluorides to insoluble form (e.g. $CaF_2$) for disposal in landfill.

DETAILED DESCRIPTION OF THE PREFERRED EMBODIMENTS

Figure 1:
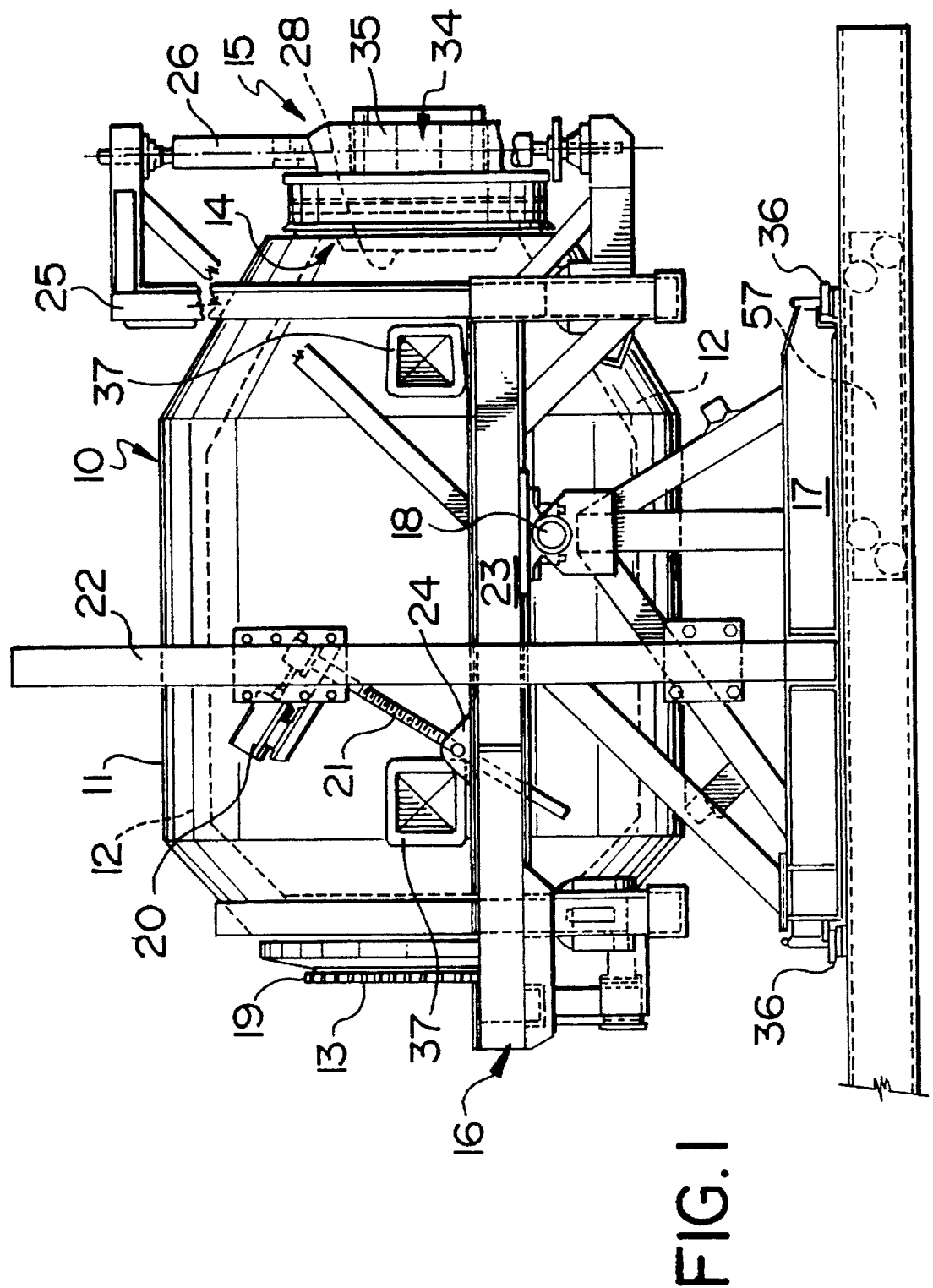
FIG. 1 is a side elevational view of a rotary furnace (except that the plasma torch has been omitted) which can be employed for the process of the present invention.
Figure 2:
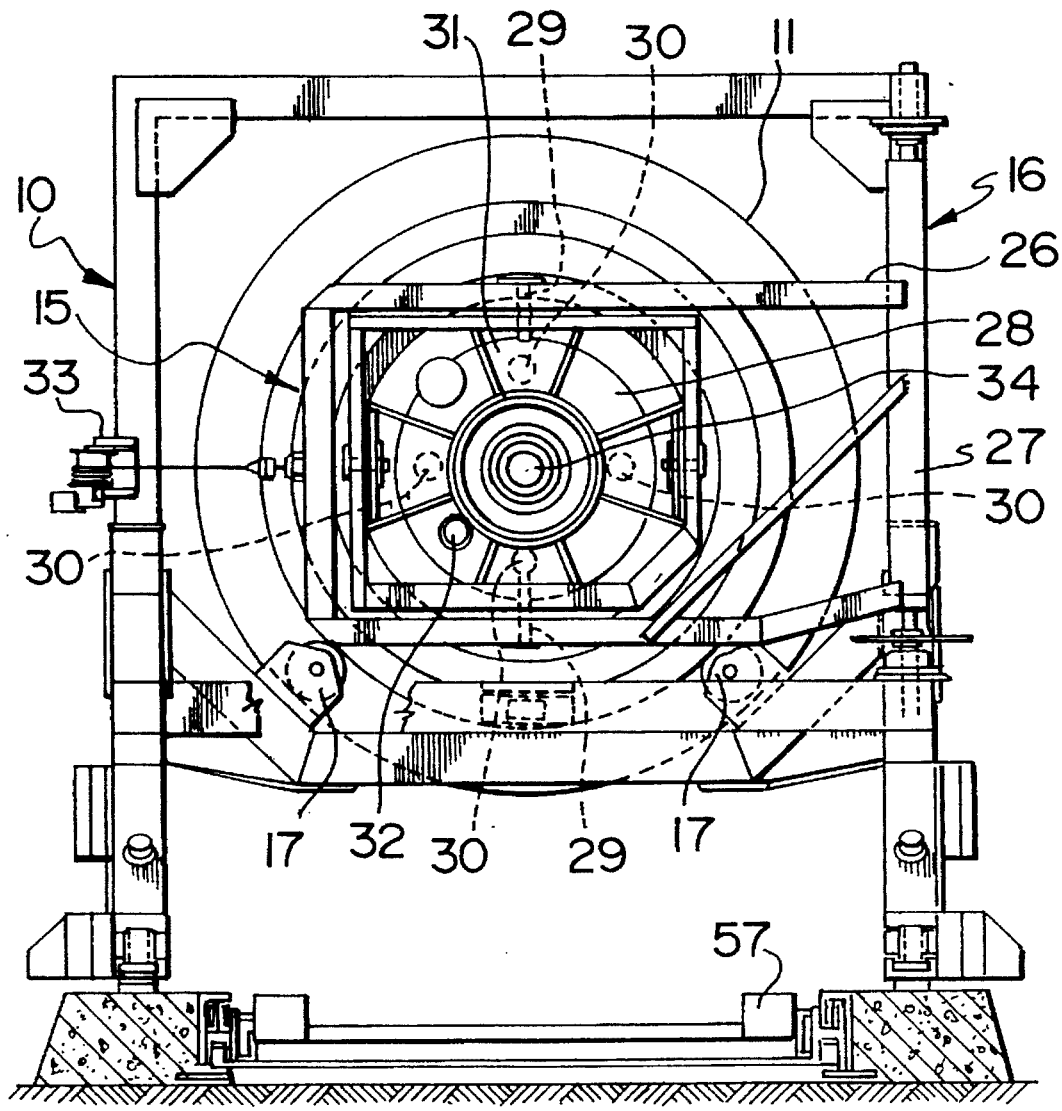
FIG. 2 is an end elevational view of the furnace of FIG. 1.

A furnace 10 in accordance with the present invention (except lacking a plasma torch) is shown in side view in FIG. 1 and in end elevation in FIG. 2. The furnace consists of a hollow steel cylinder 11 having its interior walls lined with a high temperature-resistant refractory layer 12. The walls of the cylinder taper inwardly at each longitudinal end and one end is closed by an end wall 13 while the other end has an opening 14 which is closable by a door mechanism shown generally at 15. The above structure forms an enclosed furnace chamber for treatment of the dross.

The cylinder 11 is rotatably and tiltably supported by a framework 16. The framework allows the cylinder to rotate on its longitudinal axis on rollers 17 and also permits it to tilt about pivots 18. The rotation is effected by a gear ring 19 rigidly connected to the cylinder and a chain (not shown) which passes around the gear ring and is driven by a motor (not shown) capable of rotating the cylinder either intermittently or continuously in either direction at speeds up to about 10 r.p.m. or even as high as 20 r.p.m. Tilting is effected by a motor 20 which rotates a threaded rod 21 connected between an upright gantry member 22 and a horizontal cradle member 23 via a threaded bracket 24. Rotation of the rod causes tilting of the cylinder 11 in either direction about pivot 18 preferably to an extent ranging up to about 30° above or below the horizontal.

The door mechanism 15 is supported by a framework 25 rigidly attached to the tiltable section of the main framework 16. The framework 25 comprises a door mount 26 vertically hinged at one side via a rotatable vertical shaft 27. A circular refractory lined door 28 is supported on the framework 25 by vertical pivots 29 which allow the door to tilt relative to the framework 25 so that the door can seat properly in the opening 14 in the cylinder 11. The door has four horizontal holes 30 which act as gas vents to permit escape of furnace gases to the exterior. The vents are covered by an annular channel 31 having an exhaust conduit 32.

The refractory-lined door 28 rotates with the cylinder, the door 28 is attached to the non-rotating framework 25 via a low friction annular bearing rotated under the annular channel 31. Escape of gases between the periphery of the opening 14 and the confronting periphery of the door is prevented by positioning a gasket of fibrous material around the furnace opening between the cylinder 11 and the door 28. The door is held closed by a cable and winch arrangement 33 which pulls the door into sealing contact with the cylinder 11, thus compressing the gasket.

The door 28 has a central hole 34 which receives an annular plasma torch mount 35. The walls defining the hole and the engaging parts of the mount form a ball-and-socket type of joint which permits the torch mount to be tilted relative to the longitudinal axis of the hole 34 (and consequently also relative to the central longitudinal axis of the cylinder 11). When a plasma torch is located in the mount 35, it seals the hole 34 against the release of gases but the mount permits the plasma torch to be tilted as required within the furnace. Generally the mount allows the plasma torch to be tilted by up to 15° either above or below the central longitudinal axis of the furnace.

Figure 3:
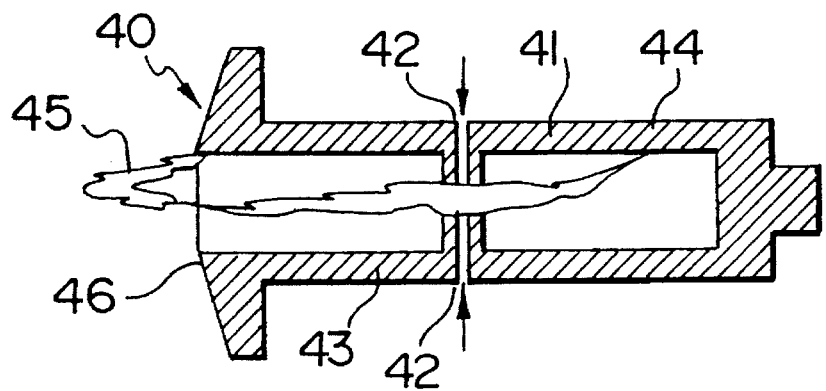
FIG. 3 is a longitudinal cross-section of a plasma torch of the type which may be used for the present invention.

A typical contained arc type of plasma torch 40 for use in the present invention is shown in FIG. 3. The torch comprises an elongated tube 41 having gas injection ports 42 located between front and rear electrodes 43 and 44, respectively. An arc 45 is struck between the front and rear electrodes and the gas is converted to plasma and ejected from nozzle 46. The plasma torch normally has a water jacket (not shown) to avoid overheating. The torch can be mounted in the furnace in the manner indicated above with the nozzle 46 projecting into the furnace.

The apparatus described above is operated in the following manner.

The furnace 10 is pre-heated either by means of a conventional heating device (e.g. a gas burner or an electric element) or by means of the plasma torch 40.

A dross charge is then prepared in a charging device (not shown) such as a shovel mounted on a fork-lift truck and specially adapted to fit within the furnace opening The door 28 is then opened and the furnace is tilted to the horizontal position by tilting motor 20. The furnace is charged with dross until the charge occupies about one quarter to one third of the total interior volume of the furnace. The weight of the load can be measured by means of four load cells 36 (FIG. 1).

The furnace is then further is then further charged with a fluoride salt in the desired ratio to the weight of the load. Preferably the fluoride salt used in recovered cryolite, and preferably it is charged at approximately 4% by weight of the load, although any charge ratio from 1% to 7% of recovered cryolite may be used, as previously stated.

The gasket of fibrous material is then installed around the furnace opening 14 and the door 28 is then closed and winch 33 operated to hold the door tightly closed.

The furnace is then tilted upwardly (door end high) by up to 30°. A higher tilting angle allows a larger dross charge to be handled because the molten metal, when formed, must not rise to the level of the door opening 14. However, the tilting angle should not be so high that a tumbling effect is prevented.

As the plasma torch is operated, the furnace is rotated at a continuous, or preferably intermittent, speed of less than 1 r.p.m. The rotation prevents a hot spot forming in the furnace lining 12 and also conveys the heat to the dross charge. The temperature of the dross charge is monitored either by thermocouples (not shown) buried in the furnace lining 12 and/or by means of a thermocouple mounted in the gas exhaust conduit 32. A high exhaust gas temperature indicates that the charge is ready or that the refractory layer is being overheated and that damage may result. A computer may be used to enable the speed of rotation of the furnace to be varied according to the temperature of the exhaust gas.

When the charge has been uniformly heated to a temperature above the melting point of the metal in the dross but below the temperature at which the fluoride salt becomes molten (generally a temperature in excess of 720° C.), the plasma output may be cut back (and optionally the plasma gas changed) and the speed of rotation of the furnace is increased until most of the metal has coalesced and separated from the solid dross residue. The rotation is then stopped and the molten metal is removed through one or more tap holes 37. The tilting and rotating capabilities of the furnace can be used to direct the molten metal towards one or other of the tap holes. The molten metal is poured into a drain pan (not shown) located under the furnace. The non-metallic impurities included in the dross remain in the furnace as a solid. It is removed by first opening the door to the furnace then tilting the furnace downwardly preferably by about 30 degrees. The non-metallic solid is then discharged into a crucible placed at the mouth of the furnace.

The process of the invention is further illustrated by the following Examples, which should not be viewed as limiting the scope of the present invention in any way.

Example 1

In this Example, a sample of dross generated from an alloying furnace in a remelt operation was treated to recover metal in a laboratory furnace, as follows.

A charge of 1 kg of dross was placed in a small indirectly-heated rotary furnace and processed under an argon atmosphere. An analysis of the dross by fire assay gave a metal content of 69% by weight. The dross was also found to contain 1.4% chlorides and 0.06% fluorides. In repeated tests, varying amounts of "recovered cryolite" were added and the dross was heated to 725° C. while rotating the furnace at 2 rpm. This operation took about 30 minutes. The rotational speed was increased to 5 rpm and the dross was heated for a further 20 minutes at 725° C.

Figure 4:
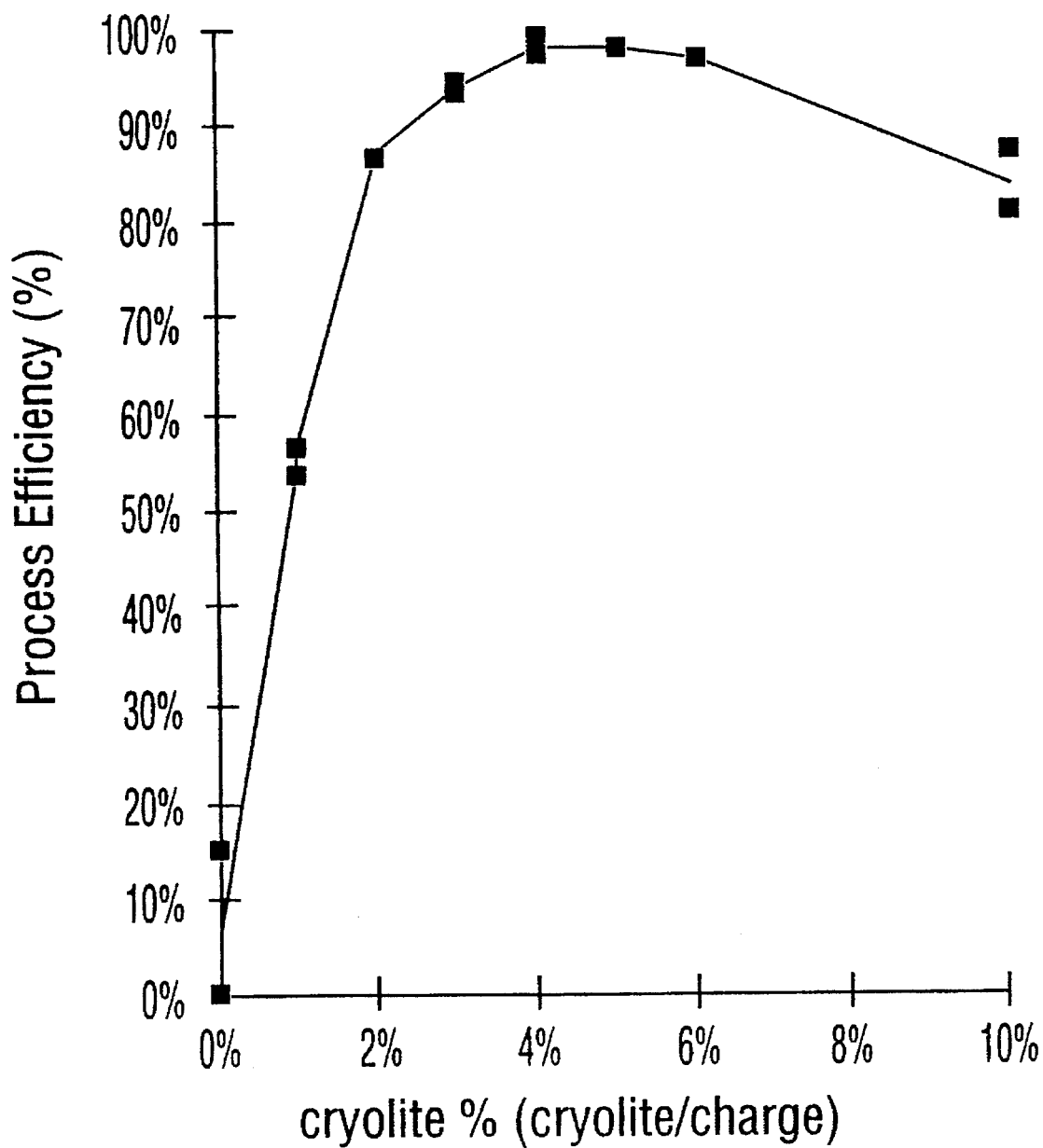
FIG. 4 is a graph showing the results obtained in Example 1, below.

After the test, the liquid metal and non-metallic residue were cooled in the furnace under an argon atmosphere. The metal recovery was compared to the dross metal content as measured by fire assay to obtain the recovery efficiency. This is plotted in FIG. 4 of the accompanying drawings.

These results show the operational range for the fluoride salt additive. The small scale of the test most likely exaggerated the observed effect, but the improvement resulting from fluoride additions is clear.

Example 2

In this Example, a thirty ton sample of dross from a similar source as the dross of Example 1 was processed in an industrial-size plasma dross furnace of the type shown in FIGS. 1 to 3.

The metal content of the dross determined by fire assay was found to be 65.5%, and the chloride and fluoride contents were 3.2% and 0.15%, respectively. In repeated tests, the dross was processed under air and nitrogen at two levels of recovered cryolite additions. The recovery efficiency is shown in Table 1 below. This full scale process test still demonstrates the improved recovery with the addition of recovered cryolite under either air or nitrogen, but further shows the advantage of using nitrogen in place of air as a plasma torch gas.

TABLE 1

| Torch gas | Cryolite addition (cryolite/charge) | F | Recovery efficiency |
|---|---|---|---|
| air | 0% | 0% | 87.0% |
| air | 4% | 0.96% | 91.3% |
| $N_2$ | 1% | 0.49% | 90.8% |
| $N_2$ | 4% | 1.96% | 95.1% |

Example 3

In this Example, long term trials using drosses from the same source as the other Examples (total dross treated 500 to 1000 metric tons) were carried out in an industrial-size plasma dross furnace of the type shown in FIGS. 1 to 3 and also in a conventional rotary salt flux furnace using a conventional salt flux (NaCl-KCl-5% cryolite). Plasma dross furnace runs using air with no fluoride salt additions and $N_2$ with 4% recovered cryolite additions (1–96% F) were used. The average metal recovery from the dross over the period of the long term trials is shown in Table 2 below and indicates that the use of fluoride salt with the plasma processing results in increased recovery over the conventional rotary salt furnace.

TABLE 2

| Process | Average metal recovery |
| --- | --- |
| Air/plasma/ no added fluoride salt | 62% |
| Rotary salt furnace | 67% |
| $N_2$/plasma/ 4% added cryolite | 70% |

Example 4

Laboratory tests were performed to determine the metal recovery efficiency for a variety of chloride and fluoride fluxes at very low concentrations. Two fluoride fluxes including one containing Na and three chloride fluxes (two of which contain small amounts of fluorides) were used. All salts were added at the rate of 1% by weight salt in the dross. The metal recovery is shown in Table 3 and shows that fluoride salts are much more effective than chloride salts at metal recovery by this process, and that Na based fluoride salts are more effective than other fluoride salts. The preferred recovered cryolite salt is the most effective.

TABLE 3

| Type | Name | F % | Metal Recovery |
| --- | --- | --- | --- |
| Fluoride | $AlF_3$ | 0.66 | 50.5% |
| Fluoride | Recovered Cryolite | 0.49 | 54.7% |
| Chloride | 50% KCl - 50% NaCl | 0.0 | 0% |
| Chloride | A103-2 ™ Flux | 0.02 | 8.1% |
| Chloride | Promag S ™ Flux | 0.01 | 22.3% |

Note:
A103-2 ™ Flux: Estimated purity 85%, 47.5 KCl, 47.5 NaCl, 5% $Na_3AlF_6$
Promag ST ™ Flux: Estimated purity 85%, 40% KCl, 60% $MgCl_2$, 1.4% F

What we claim is:

1. A process of recovering a non-ferrous metal, having a melting point, from a dross containing the metal, comprising:

introducing into a rotary furnace said dross and a material comprising a fluoride salt which becomes substantially molten only at temperatures above the melting point of the metal;

heating the dross and said material to a maximum temperature above the melting point of the metal using a heating means that substantially maintains a non-oxidizing atmosphere in the furnace;

rotating the furnace in a manner selected from the group consisting of continuous rotation, intermittent rotation and reciprocating rotation until the dross reaches said maximum temperature;

removing the molten metal thereby separated from a solid dross residue; and removing said solid dross residue from the furnace;

said material and said maximum temperature being chosen to avoid clumping of said dross or conversion of said dross to a paste as said dross and material are heated and rotated in said furnace.

2. A process according to claim 1 comprising heating said dross and said material to a temperature, being said maximum temperature, that is above the melting point of the metal but below the temperature at which said material becomes substantially molten.

3. A process according to claim 1 comprising employing, as said material, a fluoride salt or fluoride salt mixture that remains substantially solid during said heating of said dross.

4. A process according to claim 1 comprising employing, as said material, a compound selected from the group consisting of NaF, $AlF_3$, $CaF_2$, $K_3AlF_6$, KF, LiF, $MgF_2$, $Na_3AlF_6$ and mixtures thereof.

5. A process according to claim 1 comprising employing, as said material, a compound selected from the group consisting of cryolite, recovered cryolite, $AlF_3$, NaF and mixtures thereof.

6. A process according to claim 1 comprising employing said material in an amount of 0.4 to 8%, measured as weight F, by weight of the dross.

7. A process according to claim 1 comprising employing, as said material, a compound selected from the group consisting of cryolite and recovered cryolite in an amount of 0.4 to 3.5% F by weight of the dross.

8. A process according to claim 1 comprising heating said dross and said material by means of a plasma.

9. A process according to claim 1 comprising heating said dross and said compound by a plasma selected from the group consisting of a DC arc operating between consumable electrodes, a DC arc operating between non-consumable electrodes, a transferred arc and a contained arc.

10. A process according to claim 1 comprising heating said dross and said material by means of a contained arc plasma generator.

11. A process according to claim 10 comprising operating said plasma generator employing a gas selected from the group consisting of nitrogen, hydrogen, carbon monoxide, argon, oxygen-depleted air and mixtures thereof.

* * * * *